(12) United States Patent
Morita et al.

(10) Patent No.: US 8,597,393 B2
(45) Date of Patent: Dec. 3, 2013

(54) PLEATED AIR FILTER PACK AND AIR FILTER USING SAME

(75) Inventors: Jun Morita, Yuki (JP); Hitoshi Niinuma, Yuki (JP); Norikazu Shinya, Yuki (JP); Tomoyuki Hasegawa, Yuki (JP); Osamu Kitayama, Yuki (JP)

(73) Assignee: Nippon Muki Co., Ltd., Taitou-Ku (JP)

( * ) Notice: Subject to any disclaimer, the term of this patent is extended or adjusted under 35 U.S.C. 154(b) by 55 days.

(21) Appl. No.: 13/142,225

(22) PCT Filed: Oct. 20, 2009

(86) PCT No.: PCT/JP2009/005477
§ 371 (c)(1),
(2), (4) Date: Sep. 19, 2011

(87) PCT Pub. No.: WO2010/073451
PCT Pub. Date: Jul. 1, 2010

(65) Prior Publication Data
US 2011/0314782 A1  Dec. 29, 2011

(30) Foreign Application Priority Data
Dec. 25, 2008 (JP) ................. 2008-330563

(51) Int. Cl.
*B01D 46/00* (2006.01)
(52) U.S. Cl.
USPC ........................................................ 55/521
(58) Field of Classification Search
USPC .................. 55/497, 521, 527, DIG. 5, 382; 210/493.3, 493.5, 506, 507
See application file for complete search history.

(56) References Cited

U.S. PATENT DOCUMENTS

| | | | | |
|---|---|---|---|---|
| 3,531,920 A | * | 10/1970 | Hart | 55/497 |
| 5,028,331 A | | 7/1991 | Lippold | |
| 5,053,131 A | | 10/1991 | Lippold | |
| 5,066,319 A | * | 11/1991 | Lippold | 55/521 |

(Continued)

FOREIGN PATENT DOCUMENTS

| | | |
|---|---|---|
| EP | 0382331 A1 | 8/1990 |
| JP | 61-75819 U | 5/1986 |

(Continued)

OTHER PUBLICATIONS

Supplementary European Search Report dated Apr. 25, 2012, issued for the European Patent Application No. 09834268.6.

(Continued)

*Primary Examiner* — Duane Smith
*Assistant Examiner* — Minh-Chau Pham
(74) *Attorney, Agent, or Firm* — Edwards Wildman Palmer LLP; James E. Armstrong, IV; George N. Chaclas

(57) ABSTRACT

The invention provides a filter pack of which the mass is not increased, and moreover, the effective filter medium area is not reduced, and of which the pressure drop is sufficiently low, and the strength is sufficiently high, and an air filter using this.

A pleated air filter pack is configured in such a way that dot embossed projections are provided on front and rear surfaces of a filter medium made of a non-woven fabric, the filter medium is folded in zigzag shape along creases of pleats, and the opposing embossed projections are brought into contact with each other when the filter medium is folded, thus maintaining the intervals between the filter media.

17 Claims, 3 Drawing Sheets

(56) References Cited

U.S. PATENT DOCUMENTS

| | | | |
|---|---|---|---|
| 5,066,400 A | 11/1991 | Rocklitz et al. | |
| 5,089,202 A | 2/1992 | Lippold | |
| 5,505,852 A | 4/1996 | van Rossen | |
| 5,804,014 A | 9/1998 | Kahler | |
| 5,888,262 A * | 3/1999 | Kahler | 55/497 |
| 6,165,242 A * | 12/2000 | Choi | 55/524 |
| 7,588,619 B2 * | 9/2009 | Chilton et al. | 55/521 |
| 7,691,186 B2 * | 4/2010 | Wiser | 96/17 |
| 7,896,940 B2 * | 3/2011 | Sundet et al. | 55/486 |
| 2002/0083692 A1 * | 7/2002 | Richerson et al. | 55/521 |
| 2007/0107393 A1 * | 5/2007 | Worthington et al. | 55/501 |
| 2009/0199527 A1 * | 8/2009 | Wehr et al. | 55/521 |
| 2012/0223008 A1 * | 9/2012 | Mbadinga-Mouanda et al. | 210/493.5 |
| 2012/0223009 A1 * | 9/2012 | Mbadinga-Mouanda et al. | 210/493.5 |

FOREIGN PATENT DOCUMENTS

| | | |
|---|---|---|
| JP | 1-137715 U | 9/1989 |
| JP | 3-196807 A | 8/1991 |
| JP | 7-504358 A | 5/1995 |
| JP | 09-507157 A | 7/1997 |
| JP | 09-220427 A | 8/1997 |
| JP | 2000-107539 A | 4/2000 |
| JP | 2001-524373 A | 12/2001 |
| WO | WO-02/055179 A1 | 7/2002 |

OTHER PUBLICATIONS

International Search Report dated Dec. 15, 2009, issued for PCT/JP2009/005477.

* cited by examiner

PLEATED AIR FILTER PACK AND AIR FILTER USING SAME

TECHNICAL FIELD

The present invention relates to a pleated air filter pack into which a filter medium is folded in zigzag shape, and an air filter using this.

BACKGROUND ART

To date, as a manufacturing method of a pleated air filter pack into which a filter medium is folded in zigzag shape, there has been proposed a method, disclosed in Patent Document 1, whereby a resin which is an interval maintaining material is applied in constant thickness on either surface of at least each side portion of the filter medium, forming resin layers, after which the filter medium is folded in zigzag shape at regular intervals, and the resin layers are solidified, thus making the intervals between the folds of the filter medium constant.

With the heretofore described method, as the obtained zigzag-shaped filter medium for an air filter is such that the filter medium allowing air to pass through is folded at regular intervals, the flow direction of the air entering from one side of the filter medium, when discharged from the other side of the filter medium, is perpendicular to the filter medium, meaning that it is not possible to obtain a predetermined airflow pressure unless the pressure of the air caused to pass through is increased.

In order to solve this problem, a method of providing pleats with a tapered form by applying a hot melt adhesive in layers and forming a gradient from a ridge to a valley of the crease is proposed in Patent Document 2.

Also, a method of maintaining the intervals between pleats using projections formed by an embossing is proposed in Patent Document 3.

RELATED ART DOCUMENTS

Patent Documents

Patent Document 1: JP-B-54-30144
Patent Document 2: JP-A-2003-284914
Patent Document 3: Japanese Patent No. 2,935,432

DISCLOSURE OF THE INVENTION

Problems that the Invention is to Solve

However, in the case of the manufacturing method described in Patent Document 2, as a hot melt adhesive is used to maintain the intervals between the pleats of the filter pack, there have been problems in that the mass of the filter pack increases, and it is difficult to handle the filter pack, and in that the effective filter medium area decreases, and the lifespan is shortened. Also, in Patent Document 3, as the filter pack is reinforced by applying an adhesive to portions wherein the embossed projections make contact with each other, there have been problems in that the mass of the filter pack increases, and it is difficult to handle the filter pack, and in that a decrease in effective filter medium area is unavoidable.

Therefore, the invention proposes a filter pack of which the mass is not increased, and moreover, the effective filter medium area is not reduced, and of which the pressure drop is sufficiently low, and the strength is sufficiently high, and an air filter using this.

Means of Solving the Problems

In order to solve such problems, the inventors and the like have found the following configurations as a result of earnest study.

That is, according to Embodiment 1 of the pleated air filter pack of the invention, a pleated air filter pack is characterized in that dot embossed projections are provided on front and rear surfaces of a filter medium made of a non-woven fabric, the filter medium is folded in zigzag shape along creases of pleats, and the opposing embossed projections are brought into contact with each other when the filter medium is folded, thus maintaining the intervals between the filter media.

Also, according to a pleated air filter pack described in Embodiment 2, the pleated air filter pack described in Embodiment 1 is characterized in that supports for connecting the creases are provided.

Also, according to a pleated air filter pack described in Embodiment 3, the pleated air filter pack described in Embodiment 1 or 2 is characterized in that the dot embossed projections are formed and arranged in both an MD direction and CD direction of the filter medium, a plurality of dot embossed projections linearly aligned in the MD direction of the filter medium have a gradient in a height direction such that the projections gradually decrease in height as they go from a ridge toward a valley of the crease of a pleat, and a plurality of dot embossed projections linearly aligned in the CD direction has a constant height in each row.

Also, according to a pleated air filter pack described in Embodiment 4, the pleated air filter pack described in Embodiment 1 is characterized in that the dot embossed projections each has a top surface parallel to a filter medium plane.

Also, according to a pleated air filter pack described in Embodiment 5, the pleated air filter pack described in Embodiment 1 is characterized in that the widths of the plurality of dot embossed projections aligned in the MD direction increase as they go from the valley toward the ridge of the crease of the pleat.

Also, according to a pleated air filter pack described in Embodiment 6, the pleated air filter pack described in Embodiment 1 is characterized in that the forms of the opposing dot embossed projections are not symmetrical, and a raised portion and a depressed portion are further formed on each of the projections in contact with each other.

Also, according to a pleated air filter pack described in Embodiment 7, the pleated air filter pack described in Embodiment 1 is characterized in that the total area of the dot embossed projections formed on the filter medium accounts for less than 25% of the whole area of the filter medium.

Also, according to a pleated air filter pack described in Embodiment 8, the pleated air filter pack described in Embodiment 2 is characterized in that the supports are of a thermoplastic resin foam.

Also, according to a pleated air filter pack described in Embodiment 9, the pleated air filter pack described in Embodiment 8 is characterized in that the expansion ratio of the thermoplastic resin foam is more than the original size and less than threefold.

Also, according to a pleated air filter pack described in Embodiment 10, the pleated air filter pack described in Embodiment 8 is characterized in that 5 mm or more of the supports of the resin foam is held inside the creases, and 0.5 to 1 mm is exposed outside the creases.

Also, an air filter of the invention, as described in Embodiment 11, is characterized by using the filter pack of Embodiment 1.

Advantage of the Invention

According to the invention, it is possible to obtain a filter pack of which the mass is not increased, and moreover, the effective filter medium area is not reduced, and of which the pressure drop is sufficiently low, and the strength is sufficiently high, and an air filter using this.

Figure 3:
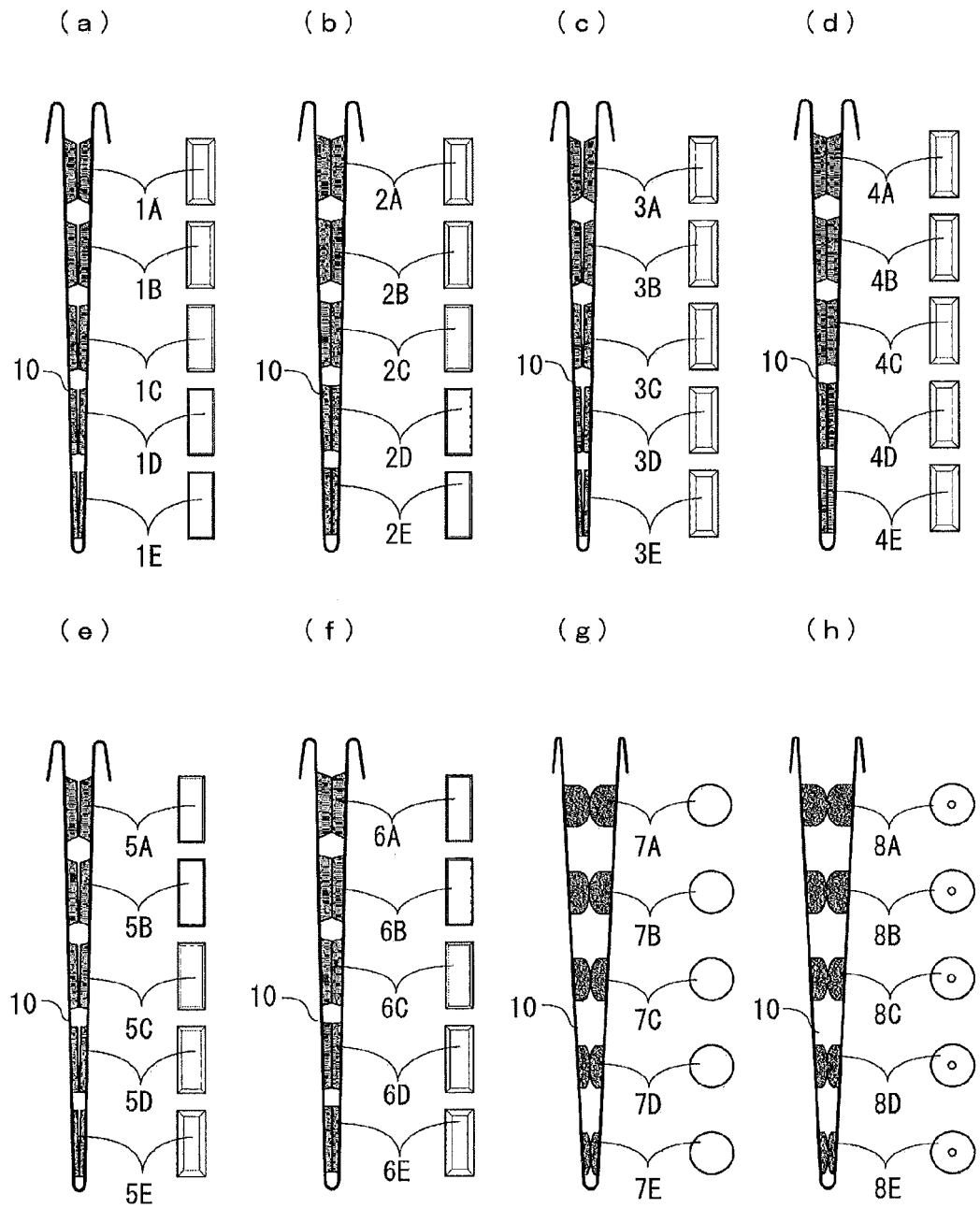

(a), (b), (c), (d), (e), (f), (g), and (h) of FIG. 3 are side views of various kinds of form of the pleated air filter pack of the invention before the formation of the supports in a folded condition.

Figure 4:
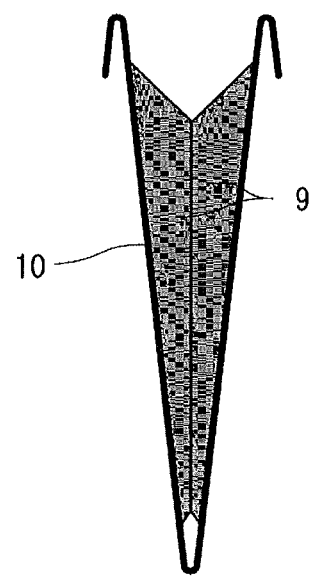

FIG. 4 is a side view of a heretofore known pleated air filter pack.

Figure 5:
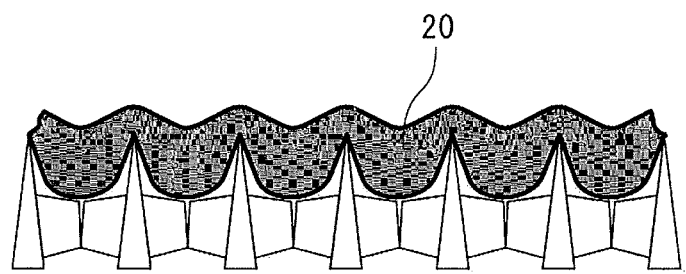

FIG. 5 is a side view of a pleated air filter pack in a condition after supports are provided on the pleated air filter pack of (a) of FIG. 3.

Figure 6:
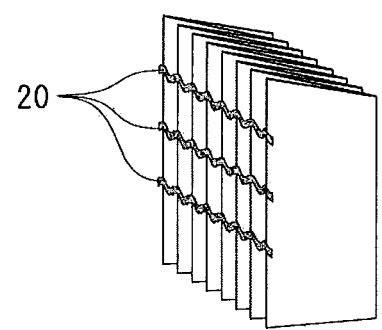

FIG. 6 is a perspective view of the same.

MODE FOR CARRYING OUT THE INVENTION

A pleated air filter pack of the invention is characterized in that dot embossed projections are provided on front and rear surfaces of a filter medium made of a non-woven fabric, the filter medium is folded in zigzag shape along creases of pleats, and the opposing embossed projections are brought into contact with each other when the filter medium is folded, thus maintaining the intervals between the filter media.

The embossed projections are formed on both the front and rear surfaces in such a way that it is possible to maintain the intervals between the adjacent filter media when the filter medium is folded in zigzag shape.

Dots can be formed in various forms. Herein, the embossed projections projecting from the filter medium to the front side are called raised projections, and the embossed projections projecting therefrom to the opposite side are called depressed projections. That is, the depressed projections when seen from one surface of the filter medium are the raised projections when seen from the other surface.

The form of the dots will be defined assuming that the embossed projections are the raised projections. The profiles of portions from which the raised projections rise can be seen when the raised projections are viewed from a line perpendicular to a filter medium plane, but in the profiles, herein, a maximum width of the dot embossed projections in a CD direction of the filter medium is called a dot embossed projection width, and a maximum length of the dot embossed projections in an MD direction of the filter medium is called a dot embossed projection length.

Also, when a virtual plane parallel to the filter medium plane makes contact with a highest portion of each raised projection, the interval between the virtual plane and filter medium plane is called a dot embossed projection height, and a plane including that contact point is called a top surface.

The form of the dot embossed projections can be selected from among various kinds of form such as, for example, a rectangular parallelepiped, a cube, a prism, a cylinder, a hemisphere, a spherical zone, a truncated pyramid, a cone, a pyramid, or a truncated cone. Also, the opposing dot projections are not necessarily of asymmetrical form, but may be of a kind of form in a lock-and-key relationship wherein a raised portion and a depressed portion are further formed respectively on each projection in contact. In the case of this form, it is difficult for the embossed projections in contact with each other to come out of contact, and it is possible to provide a firmer filter pack.

The top surfaces of the projections may be flat as in a rectangular parallelepiped, a cube, or the like, or may be formed in round shape like a hemisphere, a cylinder, or the like.

The dot embossed projection height is preferably 0.1 mm to 5.0 mm, and more preferably, 0.2 mm to 3.0 mm. This is because, when the height is greater than 5.0 mm, there is fear that damage to the filter medium occurs along with an embossing, and when the height is less than 0.1 mm, it is difficult to maintain the intervals between the filter media.

Also, the dot embossed projection width is preferably 1.0 mm to 10 mm, and more preferably, 2.0 mm to 6.0 mm. This is because, when the width is greater than 10 mm, there is fear that the projections cause a structural resistance when air is caused to flow through the filter pack into which the filter medium is folded, leading to an increase in pressure drop, and when the width is less than 1.0 mm, there is fear that it is not possible to maintain the intervals due to the embossed projections coming out of contact with each other when the medium is folded in pleats.

Also, the dot embossed projection length is preferably 1.0 mm to 20 mm, and more preferably, 5.0 mm to 15 mm. This is because, when the length is greater than 20 mm, there is fear that the lifespan is shortened due to a decrease in effective filter medium area of the filter medium, and when the length is less than 1.0 mm, there is fear that it is not possible to maintain the intervals due to the embossed projections coming out of contact with each other when the medium is folded in pleats.

As the form of the dot embossed projections, the width and length are taken to be as follows.

Regarding one dot embossed projection, a ratio of the length to the width (length/width), that is, an aspect ratio is preferably 0.5 to 4, and more preferably, 1 to 3. This is because, when the aspect ratio is less than 0.5, there is fear that it is not possible to maintain the intervals due to the embossed projections coming out of contact with each other when the medium is folded in pleats, and when the aspect ratio is higher than 4, there is fear that the lifespan is shortened due to a decrease in effective filter medium area of the filter medium.

As the form of a dot embossed projection, an embossed projection rise angle when looking up from the filter medium plane is taken to be as follows.

An angle which a straight line connecting a point on a side nearest to the crease ridge on a profile line from which the dot embossed projection rises and a highest point of the dot embossed projection forms with the filter medium plane is taken to be a rise angle.

When the top surface of the dot embossed projection is planar, the heretofore described highest point is taken to be a point nearest to the ridge of the crease.

Regarding the rise angle, when the rise angle is small, the area of the top surface of the projection also decreases, meaning that there is fear that it is not possible to gain a sufficient area in which the dot embossed projection is in contact with the opposed dot embossed projection, thus affecting the maintenance of the intervals between the pleats. On the other hand, when the height of the embossed projection is low, it does not happen that the area of the top surface decreases even though the rise angle is small.

The rise angle is preferably 10 degrees to 40 degrees. This is because, when the rise angle exceeds 40 degrees, a burden on the filter medium increases, and when the rise angle is less than 10 degrees, the area of the top surface of the projection decreases, meaning that there is fear that it is not possible to gain a sufficient area in which the dot embossed projection is in contact with the opposed dot embossed projection, thus affecting the maintenance of the intervals between the pleats.

A plurality of the dot embossed projections are aligned in the MD direction of the filter medium, and their individual heights decrease gradually as they go from the ridge to the valley of the crease, thereby enabling the pleats to be maintained in a V-shape (it is shown in Patent Document 2 that the pressure drop is low with the V-shape).

A plurality of the embossed projections aligned in the CD direction of the filter medium have a constant height in each row, thereby enabling the filter pack to be made uniform.

The number of dot embossed projections included in one column in the MD direction is preferably three or more and 15 or less. When the number is smaller than three, it is difficult to maintain the intervals between the pleats with the dot embossed projections, meaning that there is fear that opposing filter medium portions other than the projections make contact with each other when causing air to pass through, leading to an increase in pressure drop. On the other hand, when the number of dot embossed projections is 16 or more, the embossed projections account for a larger area, and it may happen that it is not possible to exploit the advantage of the effective filter medium area being larger as compared with linear embossed projections.

The intervals between the dot embossed projections aligned in the MD direction are preferably 5 mm to 25 mm. This is because, when the intervals are narrower than 5 mm, the embossed projections account for a larger area, meaning that there is fear that it is not possible to exploit the advantage of the effective filter medium area being larger as compared with the linear embossed projections, and when the intervals are wider than 25 mm, a bulge occurs in the pleats when causing air to pass through, meaning there is fear that adjacent filter medium surfaces make contact with each other.

The intervals between the dot embossed projections aligned in the CD direction are such that the interval between adjacent raised projection rows is preferably 15 mm to 60 mm. A depressed projection row is included between adjacent raised projection rows, but the depressed projection row is preferably formed in a middle portion between the raised projection row and raised projection row. This is because, in the event that the depressed projection row is disposed off-center, when air is caused to flow through the filter pack into which the filter medium is folded, the airflow becomes non-uniform, and there is fear of an increase in pressure drop.

The folded width of the filter medium is preferably 30 mm to 280 mm. When the folded width is less than 30 mm, it is necessary to include a larger number of pleat ridges for the sake of a filter's lifespan, meaning that there is fear that it is not possible to sufficiently maintain the intervals between the pleats. On the other hand, when the folded width exceeds 280 mm, it is necessary to increase the height of the dot embossed projections in order to widen the intervals between the pleats, meaning that a breakage of the filter medium becomes more likely to occur.

Each dot embossed projection is preferably configured to have a top surface parallel to the filter medium plane. This is for the following reasons. Moderate bending resistance is necessary in order to fold a non-woven fabric filter medium into a filter pack, but a rolled filter medium has a tendency for curl to remain due to bending resistance. In the event that curl remains, when the filter medium is pleated, the pleats do not form a clear V-shape, causing an increase in pressure drop. Therefore, by providing no gradient in height along the embossed projections, it is possible, even when some curl remains, to suppress the effect thereof as much as possible.

Also, the widths of the plurality of embossed projections aligned in the MD direction of the filter medium preferably increase as they go from the valley to the ridge of the crease. This is because, when high dot embossed projections are formed and the widths of the projections are narrow, a force acting on the unit area of the filter medium increases, meaning that there is fear of a breakage of the filter medium, but by increasing the widths of the high dot embossed projections, it is possible to prevent a breakage of the filter medium.

The filter medium used in the invention, provided that it is made of a non-woven fabric, such as a polyolefin series or a polyester series, satisfying a filtration performance, is not particularly limited.

Also, the total area of the dot embossed projections formed on the filter medium accounts for preferably less than 25% of the whole area of the filter medium, and more preferably, less than 20%. This is because, in the case of 25% or more, the effective area of the filter medium decreases, meaning that there is fear of causing a decrease in dust holding capacity.

The filter pack is preferably reinforced by providing supports for connecting the creases of the pleats. This is because, by doing so, when the filter pack is used as a filter, it is possible to prevent the pleats from being undone when air is caused to pass through, or the pack from bulging when a large volume of air flows, and prevent the pack from flying downwind by some chance. Also, the form stabilizes, and handleability also improves.

Also, the supports are preferably of a thermoplastic resin foam. This is because, by using a thermoplastic resin, the resin is comparatively easily incinerated after being used. Furthermore, by using a foam, as well as it being possible to reduce the amount of resin used, thus contributing to the effective utilization of resources, and reducing the amount of waste after the resin is used, it is possible to achieve a reduction in weight of products, and improve handleability.

Also, the supports for connecting the creases are preferably provided immediately above the embossed projection columns. This is because, although the supports and embossed projection columns themselves are originally of a structure which prevents the flow of air, by aligning them on the same lines when seen from an air inflow direction, it is possible to minimize the projected area of the structure, and prevent an unnecessary increase in pressure drop.

Also, the supports for connecting the creases are preferably provided at intervals of 25 mm to 300 mm. This is because, in the case of less than 25 mm, there is fear that the supports become a structure, causing an increase in pressure drop, and in the case of 300 mm or more, there is fear that it is not possible to sufficiently maintain the strength.

Also, a gas injected for a foam formation is preferably a gas from which oxygen is removed. This is because, when a gas includes oxygen, there is fear that deterioration due to oxidation of a thermoplastic resin is accelerated.

Also, the expansion ratio of a thermoplastic resin foam is preferably more than the original size and less than threefold. This is because, in the case of the original size (non-foaming), the foam droops to the inner side of the creases due to gravity when applied, and it is not possible to sufficiently increase the strength of the pack. On the other hand, in the case of threefold or more, the absolute quantity of the thermoplastic resin is small, meaning that there is fear that the strength decreases.

The expansion ratio used herein is taken to be a ratio of a volume occupied by a foamed resin and a volume occupied by a resin of the same mass when non-foaming.

Also, the thickness of the supports formed from a thermoplastic resin foam is preferably 3 to 15 mm. This is because, when the thickness is less than 3 mm, there is fear that the strength is not sufficient, and when the thickness is greater than 15 mm, there is fear that the supports become a structure, causing an increase in pressure drop.

Also, it is preferable that 5 mm or more of the supports formed from a thermoplastic resin foam is held inside the creases, and around 0.5 to 1 mm is exposed outside the creases. This is because it is possible to improve the strength of bond to the filter medium by holding 5 mm or more of the supports inside the creases, and it is possible to function as horizontal supports by exposing around 0.5 to 1 mm of the supports outside the creases.

Also, an air filter using the heretofore described pleated air filter pack can be used as an air filter which has a large air volume and a low pressure drop, and whose strength is sufficiently high.

WORKING EXAMPLES

Next, working examples of the invention will be described together with heretofore known examples and comparison examples. A filter medium for an air filter of the invention shall not be interpreted as limited to the following examples.

Figure 1:
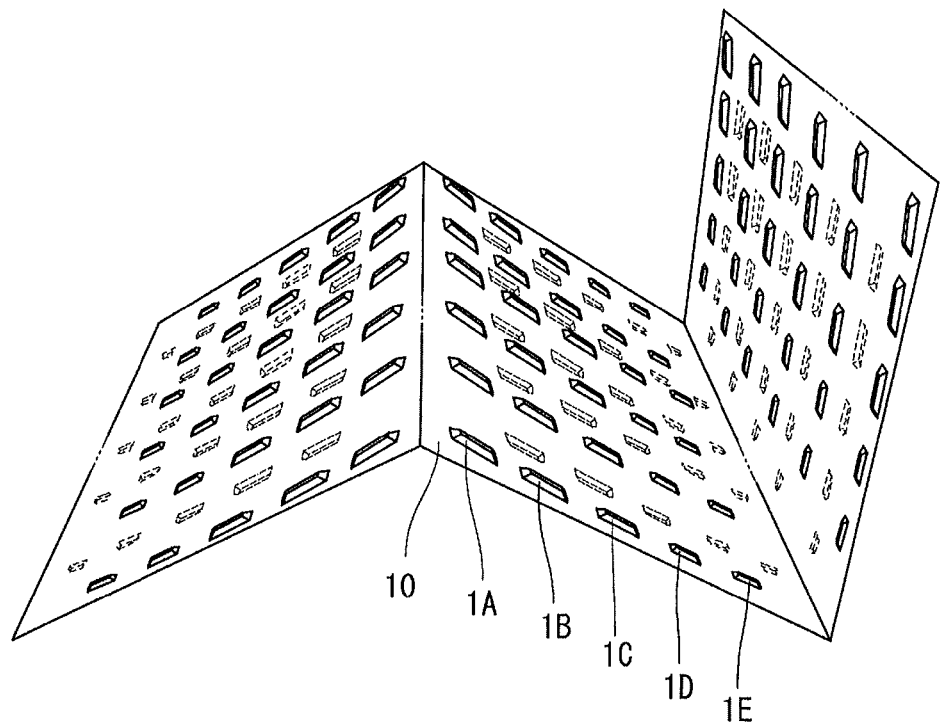
FIG. 1 is a perspective view of an embodiment of a pleated air filter pack of the invention in a condition before a folding (before a formation of supports).
Figure 2:
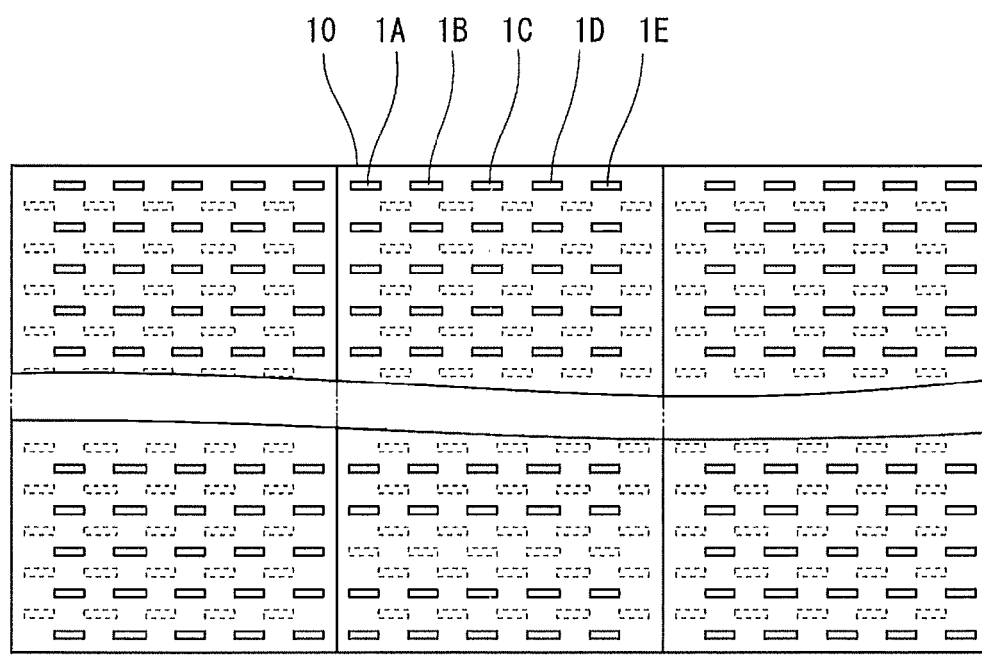
FIG. 2 is a plan view of the same.

FIG. 1 is a perspective view of a pleated air filter pack of the invention into which the filter medium is not folded with dot embossed projections formed thereon, FIG. 2 is a plan view of FIGS. 1, (a), (b), (c), (d), (e), (f), (g), and (h) of FIG. 3 are side views of the pleated air filter pack of the invention into which the filter medium is folded with the dot embossed projections formed thereon, FIG. 4 is a side view of a pleated air filter pack of a heretofore known example into which a filter medium is folded with linear embossed projections 9 formed thereon, FIG. 5 is a side view of a pleated air filter pack wherein a support is provided on the pleated air filter pack of (a) of FIG. 3 into which the filter medium is folded with the dot embossed projections formed thereon, and FIG. 6 is a perspective view of the same.

10 indicates a composite filter medium, 1, 2, 3, 4, 5, 6, 7, and 8 indicate dot embossed projections, and A, B, C, D, and E are given to the dot embossed projections in each row 1, 2, 3, 4, and 5 respectively from the ridge to the valley of the crease.

Working Example 1

As shown in (a) of FIG. 3, dot embossed projections 1A, 1B, 1C, 1D, and 1E of the following kind of form are formed using a composite filter medium wherein an antistatic melt blown non-woven fabric made from polypropylene acting as a filter medium layer and a thermal bond non-woven fabric made from polyester acting as a reinforcement layer are stuck together.

The form of the dot embossed projections being taken to be a truncated quadrangular pyramid, five dot embossed projections are formed in one column in the MD direction, and their individual heights are taken to be 1.5 mm, 1.2 mm, 0.9 mm, 0.6 mm, and 0.3 mm respectively from the ridge to the valley of the crease. The columns of the dot embossed projections are arranged at intervals of 25 mm in the CD direction. Their heights are deliberately not changed in the same row.

The widths of the dot embossed projections are taken to be 5.0 mm, 4.9 mm, 4.8 m, 4.7 mm, and 4.6 mm respectively from the ridge to the valley of the crease. These kinds of dot embossed projections are arranged alternately on the front and rear surfaces.

Also, the bottom lengths of the dot embossed projections are all taken to be constant at 12 mm.

The rise angles of the dot embossed projections are taken to be 30, 25, 20, 17, and 15 degrees respectively from the ridge to the valley of the crease.

The heretofore described filter medium is folded in zigzag shape with a folded width of 125 mm, thus fabricating the pleated air filter pack.

The pleated air filter pack is reinforced by providing supports 20 made of a resin on the creases, as shown in FIGS. 5 and 6, on each of the inflow side and outflow side of this filter pack. The expansion ratio of the resin is taken to be twofold. The supports 20 are arranged at intervals of 50 mm in a direction perpendicular to the creases. The supports 20 are such that 5 mm of each of them is held inside the creases, and 1 mm is exposed outside the creases.

Working Example 2

In the same way as in Working Example 1 except that the height of a dot embossed projection at an end nearest to the valley of the crease is taken to be 0.8 mm, while the height of a dot embossed projection at an end nearest to the ridge of the crease is taken to be 2.0 mm, and a continuous (intermittent) gradient is formed between them, dot embossed projections 2A, 2B, 2C, 2D, and 2E are formed, and a pleated air filter pack is fabricated, as shown in (b) of FIG. 3, and also, the air filter pack is reinforced by supports in the same way as in Working Example 1.

Working Example 3

In the same way as in Working Example 1 except that the widths of individual dots in each column of the dot embossed projections in the MD direction of the filter medium are all taken to be 4.0 mm, dot embossed projections 3A, 3B, 3C, 3D, and 3E are formed, and an air filter pack is fabricated, as shown in (c) of FIG. 3, and also, the air filter pack is reinforced by supports in the same way as in Working Example 1.

Working Example 4

In the same way as in Working Example 1 except that the widths of individual dots in each column of the dot embossed projections in the MD direction of the filter medium are all taken to be 4.0 mm, the height of a dot embossed projection at an end nearest to the valley of the crease is taken to be 0.3 mm, while the height of a dot embossed projection at an end nearest to the ridge of the crease is taken to be 1.5 mm, and a continuous (intermittent) gradient is formed between them, dot embossed projections 4A, 4B, 4C, 4D, and 4E are formed, and an air filter pack is fabricated, as shown in (d) of FIG. 4, and also, the air filter pack is reinforced by supports in the same way as in Working Example 1.

Working Example 5

In the same way as in Working Example 1 except that the widths of the dot embossed projections are taken to be 5.0 mm, 4.9 mm, 4.8 mm, 4.7 mm, and 4.6 mm respectively from the valley to the ridge of the crease, dot embossed projections 5A, 5B, 5C, 5D, and 5E are formed, and a pleated air filter pack is fabricated, as shown in (e) of FIG. 3, and also, the air filter pack is reinforced by supports in the same way as in Working Example 1.

Working Example 6

In the same way as in Working Example 1 except that the widths of the dot embossed projections are taken to be 5.0 mm, 4.9 mm, 4.8 mm, 4.7 mm, and 4.6 mm respectively from the valley to the ridge of the crease, the height of a dot embossed projection at an end nearest to the valley of the crease is taken to be 0.3 mm, while the height of a dot embossed projection at an end nearest to the ridge of the crease is taken to be 1.5 mm, and a continuous (intermittent) gradient is formed between them, dot embossed projections 6A, 6B, 6C, 6D, and 6E are formed, and an air filter pack is fabricated, as shown in (f) of FIG. 3, and also, the air filter pack is reinforced by supports in the same way as in Working Example 1.

Working Example 7

In the same way as in Working Example 1 except that the form of the dot embossed projections is made hemispherical, the rise angles are taken to be 30, 25, 20, 17, and 15 degrees respectively from the ridge to the valley of the crease, the width of the dot embossed projections is made equal to the length of the dot embossed projections, dot embossed projections 7A, 7B, 7C, 7D, and 7E are formed, and a pleated air filter pack is fabricated, as shown in (g) of FIG. 3, and also, the air filter pack is reinforced by supports in the same way as in Working Example 1.

Working Example 8

In the same way as in Working Example 1 except that the form of the dot embossed projections is made hemispherical, a raised portion with a diameter of 1 mm and a height of 1 mm is further formed at the leading end of one of the respective projections facing each other, and a depressed portion with a diameter of 1 mm and a depth of 1 mm is formed at the leading end of the other, dot embossed projections 8A, 8B, 8C, 8D, and 8E are formed, and a pleated air filter pack is fabricated, as shown in (h) of FIG. 3, and also, the air filter pack is reinforced by supports in the same way as in Working Example 1.

Working Example 9

In the same way as in Working Example 1 except that the expansion ratio of a resin of supports is taken to be 3.5 fold, as well as dot embossed projections 1A, 1B, 10, 1D, and 1E being formed, a pleated air filter pack reinforced by the supports is fabricated.

Working Example 10

In the same way as in Working Example 1 except that a position in which a resin of supports is bonded is such that 6 mm of the resin is held inside the creases and 0.2 mm is exposed outside the creases, as well as dot embossed projections 1A, 1B, 10, 1D, and 1E being formed, a pleated air filter pack reinforced by the supports is fabricated.

Working Example 11

In the same way as in Working Example 1 except that no support is provided, as well as dot embossed projections 1A, 1B, 10, 1D, and 1E being formed, a pleated air filter pack is fabricated, as shown in (a) of FIG. 3.

Heretofore Known Example 1

In the same way as in Working Example 1 except that the width of embossed projections is 4.0 mm, the height of a linear embossed projection at an end nearest to the valley of the crease is taken to be 0.3 mm, while the height of a dot embossed projection at an end nearest to the ridge of the crease is taken to be 1.5 mm, one linear embossed projection 9, 9 is formed between them in a continuous gradient, and the rise angle of the linear embossed projections is taken to be 45 degrees, an air filter pack is fabricated, as shown in FIG. 4 (refer to FIGS. 1 and 2 for the disposition). The rise angle of the dot embossed projections is taken to be 45 degrees.

Heretofore Known Example 2

By applying a hot melt adhesive in two layers, taking the widths to be all 4.0 mm from the valley to the ridge of the crease, and dividing the heights into three stages 0 mm, 1 mm, and 2 mm respectively from the valley to the ridge of the crease, a filter pack maintaining the intervals between pleats is fabricated, as shown in FIG. 2 of JP-A-2003-284914.

Heretofore Known Example 3

In the same way as in Heretofore Known Example 2 except that a hot melt adhesive is applied in one layer, the widths are all taken to be 4.0 mm from the valley to the ridge of the crease, the height of a hot melt adhesive on the part of the valley of the crease is taken to be 0.3 mm, while the height of a hot melt adhesive on the part of the ridge of the crease is taken to be 1.5 mm, and the heights are taken to be constant from the vicinity of the center to the ridge of the crease, a filter pack is fabricated, as shown in FIG. 3 of JP-A-2003-284914.

Next, regarding the working examples of the invention and the heretofore known examples, a filter unit's pressure drop, collection efficiency, and dust holding capacity (DHC) are measured in the following way, and filter medium breakages and results of making comprehensive evaluations are shown in Table 1, in addition to the measurements.

Pressure drop: a pressure difference across a filter when air with a converted face velocity of 3.1 m/sec is caused to flow through a filter unit is measured to provide a pressure drop. A filter pack with a pressure drop of 150 Pa or more is indicated by x, and a filter pack with a pressure drop of 150 Pa or less is indicated by ○.

Collection efficiency: this is measured in accordance with JIS B9908 Form 2. A filter pack with a collection efficiency of 90% or more is indicated by ○, and a filter pack with a collection efficiency of less than 90% is indicated by x.

Dust Holding Capacity (DHC): a dust holding capacity when a final pressure drop is set at 294 Pa in accordance with the heretofore mentioned JIS B9908 Form 2 is adopted. With the dimensions converted to 610 mm by 610 mm, a filter pack with a dust holding capacity of 500 g/unit or more is indicated by ○, and a filter pack with a dust holding capacity of less than 500 g/unit is indicated by x.

Filter medium breakage: a filter medium with the dot embossed projections processed thereon is visually confirmed, a filter pack wherein a breakage is found in the filter medium is indicated by x, a filter pack wherein there is no breakage, but a damaged portion is found in one portion is indicated by Δ, and a filter pack wherein no breakage is found is indicated by ○.

Mass: with the dimensions converted to 610 mm by 610 mm, a filter pack with a mass of less than 3 kg is indicated by ○, and a filter pack with a mass of 3 kg or more is indicated by x.

Effective filter medium area: a filter pack with an effective filter medium area of 75% or more is indicated by ○, and a filter pack with an effective filter medium area of less than 75% is indicated by x.

Pack strength: a filter pack in which the effect on the performance due to a deformation thereof does not occur by the time a differential pressure higher than 1500 Pa is reached is indicated by ○, a filter pack in which the effect does not occur by the time a differential pressure higher than 1000 Pa is reached is indicated by Δ, and a filter pack in which the effect occurs at a differential pressure lower than 1000 Pa is indicated by x.

Comprehensive evaluation: in the comprehensive evaluations, a filter pack with all ○ is indicated by ⊕, a filter pack including at least one Δ is indicated by ○, and a filter pack including at least one x is indicated by x.

As shown in Table 1, in Working Examples 1, 2, 7, and 8, the filter packs can be used as a filter pack of which, in addition to the basic performance being sufficient, the mass is light, the effective filter medium area is large (the DHC is large), and the pressure drop is sufficiently low, meaning that they are indicated by ⊕ in the comprehensive evaluations.

In Working Examples 3, 4, 5, and 6, the basic performance, mass, effective filter medium area, and pressure drop are sufficient, but damage is found in one portion of the filter medium, meaning that the filter packs are indicated by ○ in the comprehensive evaluations.

In Working Example 9, the basic performance, mass, effective filter medium area, and pressure drop are sufficient but, as the expansion ratio of the resin of the supports is high, the pack strength decreases, meaning that the filter pack is indicated by ○ in the comprehensive evaluation.

In Working Example 10, the basic performance, mass, effective filter medium area, and pressure drop are sufficient but, as the resin applied position of the support is too much into the creases, the pack strength decreases, meaning that the filter pack is indicated by ○ in the comprehensive evaluation.

TABLE 1

| Item | Form | Dot quantity | Gradient | width | Hot melt | Expansion ratio | Bond position | Pressure drop | Efficiency | DHC | Filter medium breakage | Effective area | Mass | Pack strength | Comprehensive evaluation |
|---|---|---|---|---|---|---|---|---|---|---|---|---|---|---|---|
| Working Example 1 | Dot | 5 | Constant | Graduated | — | Twofold | 1 mm outside 5 mm inside | 135 ○ | 93 ○ | 588 ○ | None ○ | 88 ○ | 2.5 ○ | ○ | ⊕ |
| Working Example 2 | Dot | 5 | Constant | Graduated | — | Twofold | 1 mm outside 5 mm inside | 140 ○ | 92 ○ | 576 ○ | None ○ | 88 ○ | 2.5 ○ | ○ | ⊕ |
| Working Example 3 | Dot | 5 | Constant | Constant | — | Twofold | 1 mm outside 5 mm inside | 136 ○ | 93 ○ | 583 ○ | Damaged Δ | 89 ○ | 2.5 ○ | ○ | ○ |
| Working Example 4 | Dot | 5 | Continuous | Constant | — | Twofold | 1 mm outside 5 mm inside | 142 ○ | 92 ○ | 578 ○ | Damaged Δ | 89 ○ | 2.5 ○ | ○ | ○ |
| Working Example 5 | Dot | 5 | Constant | Inversely graduated | — | Twofold | 1 mm outside 5 mm inside | 135 ○ | 92 ○ | 573 ○ | Damaged Δ | 88 ○ | 2.5 ○ | ○ | ○ |
| Working Example 6 | Dot | 5 | Continuous | Inversely graduated | — | Twofold | 1 mm outside 5 mm inside | 139 ○ | 93 ○ | 575 ○ | Damaged Δ | 88 ○ | 2.5 ○ | ○ | ○ |
| Working Example 7 | Dot | 5 | — (Curved Surface) | Graduated | — | Twofold | 1 mm outside 5 mm inside | 135 ○ | 93 ○ | 586 ○ | None ○ | 88 ○ | 2.5 ○ | ○ | ⊕ |
| Working Example 8 | Dot | 5 | — (Curved Surface) | Graduated | — | Twofold | 1 mm outside 5 mm inside | 136 ○ | 92 ○ | 576 ○ | None ○ | 88 ○ | 2.5 ○ | ○ | ⊕ |
| Working Example 9 | Dot | 5 | Constant | Graduated | — | 3.5 fold | 1 mm outside 5 mm inside | 135 ○ | 93 ○ | 588 ○ | None ○ | 88 ○ | 2.4 ○ | Δ | ○ |
| Working Example 10 | Dot | 5 | Constant | Graduated | — | Twofold | 0.2 mm outside 6 mm inside | 135 ○ | 93 ○ | 588 ○ | None ○ | 88 ○ | 2.5 ○ | Δ | ○ |
| Working Example 11 | Dot | 5 | Constant | Graduated | — | — | — | 132 ○ | 93 ○ | 580 ○ | None ○ | 88 ○ | 2.2 ⊕ | Δ | Δ |
| Heretofore Known Example 1 | Line | — | — | — | — | Twofold | 1 mm outside 5 mm inside | 130 ○ | 93 ○ | 462 X | Damaged Δ | 72 X | 2.5 ○ | ○ | X |
| Heretofore Known Example 2 | Hot melt | — | — | — | Two-layer application | — | — | 175 X | 92 ○ | 450 X | — | 70 X | 3.8 X | — | X |
| Heretofore Known Example 3 | Hot melt | — | — | — | One-layer application | — | — | 230 X | 93 ○ | 350 X | — | 70 X | 3.1 X | — | X |

In Working Example 11, as no support is provided, the mass becomes lighter, but the pack strength is low, meaning that the filter pack is indicated by Δ in the comprehensive evaluation.

In Heretofore Known Example 1, it is considered that the DHC decreases as the effective filter medium area decreases and because a horizontally dispersed flow is interrupted by the linear embossed projections, and damage is found in one portion of the filter medium, meaning that the filter pack is indicated by Δ in the comprehensive evaluation.

In Heretofore Known Example 2, the horizontally dispersed flow is made gentler, but the pressure drop is slightly higher, than in Heretofore Known Example 1, the DHC decreases as the effective filter medium area decreases, and the mass increases significantly by applying the hot melt adhesive, meaning that the filter pack is indicated by x in the comprehensive evaluation.

In Heretofore Known Example 3, as the horizontally dispersed flow is more interrupted than in Heretofore Known Example 2, the pressure drop is very high, the DHC becomes extremely low as the effective filter medium area decreases, and the mass increases significantly by applying the hot melt adhesive, meaning that the filter pack is indicated by x in the comprehensive evaluation.

INDUSTRIAL APPLICABILITY

According to the pleated air filter pack of the invention, it is possible to provide a filter pack of which the mass is not increased, and the effective filter medium area is not reduced, and of which the pressure drop is low, and the strength is high.

DESCRIPTION OF REFERENCE NUMERALS AND SIGNS 1A, 1B, 1C, 1D, 1E Dot embossed projection
2A, 2B, 2C, 2D, 2E Dot embossed projection
3A, 3B, 3C, 3D, 3E Dot embossed projection
4A, 4B, 4C, 4D, 4E Dot embossed projection
5A, 5B, 5C, 5D, 5E Dot embossed projection
6A, 6B, 6C, 6D, 6E Dot embossed projection
7A, 7B, 7C, 7D, 7E Dot embossed projection
8A, 8B, 8C, 8D, 8E Dot embossed projection
9 Linear embossed projection
10 Composite filter medium
20 Support

The invention claimed is:

1. A pleated air filter pack, wherein dot embossed projections are provided on front and rear surfaces of a filter medium made of a non-woven fabric, the filter medium is folded in zigzag shape along creases of pleats, and opposing embossed projections are brought into contact with each other when the filter medium is folded, thus maintaining intervals between the filter media, wherein widths of a plurality of the dot embossed projections aligned in a MD direction increase as the projections go from a valley toward a ridge of the creases of the pleats.

2. The pleated air filter pack according to claim 1, wherein supports for connecting the creases are provided.

3. The pleated air filter pack according to claim 1, wherein the dot embossed projections are formed and arranged in both MD direction and CD direction of the filter medium, a plurality of dot embossed projections linearly aligned in the MD direction of the filter medium have a gradient in a height direction such that the projections gradually decrease in height as the projections go from a ridge toward a valley of the crease of a pleat, and a plurality of dot embossed projections linearly aligned in the CD direction has a constant height in each row.

4. The pleated air filter pack according to claim 1, wherein the dot embossed projections each has a top surface parallel to a filter medium plane.

5. The pleated air filter pack according to claim 1, wherein forms of the opposing dot embossed projections are not symmetrical, and a raised portion and a depressed portion are further formed on each of the projections in contact with each other.

6. The pleated air filter pack according to claim 1, wherein a total area of the dot embossed projections formed on the filter medium accounts for less than 25% of a whole area of the filter medium.

7. The pleated air filter pack according to claim 2, wherein the supports are of a thermoplastic resin foam.

8. The pleated air filter pack according to claim 7, wherein an expansion ratio of the thermoplastic resin foam is more than a original size and less than threefold the original size.

9. The pleated air filter pack according to claim 7, wherein 5 mm and more of the supports of the resin foam is held inside the creases, and 0.5 to 1 mm is exposed outside the creases.

10. An air filter, wherein the filter pack according to claim 1 is used.

11. The pleated air filter pack according to claim 2, wherein the dot embossed projections are formed and arranged in both MD direction and CD direction of the filter medium, a first plurality of dot embossed projections linearly aligned in the MD direction of the filter medium have a gradient in a height direction such that the projections gradually decrease in height as the projections go from a ridge toward a valley of the crease of a pleat, and a second plurality of dot embossed projections linearly aligned in the CD direction have a constant height in each row.

12. A pleated air filter pack comprising:
a filter medium having projections on front and rear surfaces thereof,
wherein the filter medium is a non-woven fabric and folded in zigzag shape along creases of pleats such that opposing projections are brought into direct contact with each other when the filter medium is folded, thus maintaining intervals between folds of the filter medium, wherein the widths of the plurality of dot embossed projections aligned in the MD direction increase as the projections go from the valley toward the ridge of the crease of the pleat.

13. The pleated air filter pack according to claim 12, wherein the dot embossed projections are formed and arranged in both MD direction and CD direction of the filter medium, a plurality of dot embossed projections linearly aligned in the MD direction of the filter medium have a gradient in a height direction such that the projections gradually decrease in height as the projections go from a ridge toward a valley of the crease of a pleat, and a plurality of dot embossed projections linearly aligned in the CD direction has a constant height in each row.

14. The pleated air filter pack according to claim 12, wherein the dot embossed projections each has a top surface parallel to a filter medium plane and the top surfaces are substantially in full contact when brought into contact.

15. The pleated air filter pack according to claim 12, wherein forms of the opposing dot embossed projections are not symmetrical, and a raised portion and a depressed portion are further formed on each of the projections in contact with each other.

16. The pleated air filter pack according to claim 4, wherein top surfaces are substantially in full contact when brought into contact.

17. A pleated air filter pack comprising:
dot embossed projections provided on front and rear surfaces of a filter medium made of a non-woven fabric, the filter medium is folded in zigzag shape along creases of pleats, and the opposing embossed projections are brought into contact with each other when the filter medium is folded, thus maintaining intervals between the filter media, wherein the forms of the opposing dot embossed projections are not symmetrical, and a raised portion and a depressed portion are further formed on each of the projections in contact with each other.

* * * * *